United States Patent
Rubia

(10) Patent No.: US 8,688,326 B2
(45) Date of Patent: Apr. 1, 2014

(54) METHOD AND DEVICE FOR IMPROVING DRIVING COMFORT IN A STEERING ASSISTANCE SYSTEM

(75) Inventor: David Rubia, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 12/300,420

(22) PCT Filed: Apr. 3, 2007

(86) PCT No.: PCT/EP2007/053223
§ 371 (c)(1),
(2), (4) Date: Mar. 18, 2009

(87) PCT Pub. No.: WO2007/131837
PCT Pub. Date: Nov. 22, 2007

(65) Prior Publication Data
US 2010/0010712 A1   Jan. 14, 2010

(30) Foreign Application Priority Data

May 12, 2006 (DE) .......................... 10 2006 022 391

(51) Int. Cl.
*G06F 19/00* (2011.01)
*B62D 6/00* (2006.01)

(52) U.S. Cl.
USPC ................. 701/42; 701/41; 318/432; 318/433

(58) Field of Classification Search
USPC .......... 701/41, 42, 52; 318/432, 433; 340/905
IPC ...................................... B60W 30/12
See application file for complete search history.

(56) References Cited

U.S. PATENT DOCUMENTS

| 4,471,280 | A | * | 9/1984 | Stack | 318/586 |
| 5,236,056 | A | * | 8/1993 | Pfeffer et al. | 180/446 |
| 5,765,116 | A | * | 6/1998 | Wilson-Jones et al. | 701/41 |
| 5,767,642 | A | * | 6/1998 | Furukawa | 318/286 |
| 5,828,972 | A | * | 10/1998 | Asanuma et al. | 701/41 |
| 6,092,012 | A | * | 7/2000 | Shimizu | 701/41 |
| 6,212,453 | B1 | | 4/2001 | Kawagoe et al. | |
| 6,216,453 | B1 | | 4/2001 | Maurer | |
| 6,308,123 | B1 | * | 10/2001 | Ikegaya et al. | 701/41 |
| 7,069,129 | B2 | * | 6/2006 | Iwazaki et al. | 701/41 |

(Continued)

FOREIGN PATENT DOCUMENTS

| EP | 1520761 | 4/2005 |
| EP | 1602552 A2 * | 12/2005 |

(Continued)

OTHER PUBLICATIONS

International Search Report, PCT International Patent Application No. PCT/EP2007/053223, dated Aug. 20, 2007.

*Primary Examiner* — Thomas Black
*Assistant Examiner* — Sara Lewandroski
(74) *Attorney, Agent, or Firm* — Kenyon & Kenyon LLP

(57) ABSTRACT

A method for supporting a driver when steering a vehicle, in which a servo torque, as well as an additional actuating torque that may additionally be exerted on the steering system of the vehicle, are produced in order to cause the driver to make a change in the position of the steering wheel. The steering intervention by the additional required actuating torque may be made significantly more comfortable if the gradient of the actuating torque is limited to a maximum value.

8 Claims, 4 Drawing Sheets

(56) References Cited

U.S. PATENT DOCUMENTS

| | | |
|---|---|---|
| 7,128,185 B2 * | 10/2006 | Satake et al. ............... 180/446 |
| 7,177,745 B2 * | 2/2007 | Tsuchiya ...................... 701/41 |
| 7,455,142 B2 * | 11/2008 | Post, II ........................ 180/197 |
| 7,542,840 B2 * | 6/2009 | Kawakami et al. ............ 701/93 |
| 7,860,652 B2 * | 12/2010 | Nishida et al. ............... 701/514 |
| 2003/0102181 A1 * | 6/2003 | Tokumoto .................... 180/446 |
| 2004/0133330 A1 * | 7/2004 | Ono et al. ..................... 701/80 |
| 2004/0262063 A1 | 12/2004 | Kaufmann et al. |
| 2005/0121252 A1 * | 6/2005 | Tsuchiya ...................... 180/446 |
| 2005/0125135 A1 | 6/2005 | Fujioka et al. |
| 2005/0267551 A1 * | 12/2005 | Bhullar ......................... 607/88 |
| 2005/0267661 A1 * | 12/2005 | Iwazaki et al. ................ 701/41 |
| 2005/0270145 A1 * | 12/2005 | Kataoka et al. ............... 340/435 |
| 2006/0200290 A1 * | 9/2006 | Chino et al. ................... 701/41 |
| 2006/0217861 A1 * | 9/2006 | Ihara et al. .................... 701/41 |
| 2006/0259222 A1 * | 11/2006 | Farrelly et al. ................ 701/42 |
| 2007/0129872 A1 * | 6/2007 | Post, II ......................... 701/72 |
| 2007/0282502 A1 * | 12/2007 | Bayer et al. ................... 701/42 |
| 2007/0299583 A1 * | 12/2007 | Fujita et al. ................... 701/41 |
| 2008/0183342 A1 * | 7/2008 | Kaufmann et al. ............ 701/1 |
| 2009/0024278 A1 * | 1/2009 | Kondo et al. .................. 701/41 |
| 2010/0036562 A1 * | 2/2010 | Becker .......................... 701/41 |

FOREIGN PATENT DOCUMENTS

| | | |
|---|---|---|
| EP | 1602553 | 12/2005 |
| EP | 1679249 A1 * | 7/2006 |
| JP | 10-76967 | 3/1998 |
| JP | 2004351999 A * | 12/2004 |
| JP | 2005-343210 | 12/2005 |
| JP | 2006/117088 | 5/2006 |

* cited by examiner

METHOD AND DEVICE FOR IMPROVING DRIVING COMFORT IN A STEERING ASSISTANCE SYSTEM

FIELD OF THE INVENTION

The present invention relates to a method and device for supporting a driver when steering a vehicle.

BACKGROUND INFORMATION

Modern vehicles are usually equipped with power (servo) steering systems that support the driver when steering. Conventional power steering systems include an actuating device, such as for example an electric motor or a hydraulic pump, via which a support torque is exerted on the steering system that reduces the steering forces that must be applied by the driver. The magnitude of the steering torque is a function of the current driving situation, in particular on the steering or steering wheel angle and the driving speed. The support torque is usually set by a control device according to a prespecified steering characteristic.

In addition to the above-described power steering systems which reduce the application of force during steering, other conventional steering systems apply an additional actuating torque to the steering system in particular driving situations in order to cause the driver to change the position of the steering wheel. The systems are also called driver steering assistance systems. These include for example an LKS (Lane Keeping Support) system that helps the driver keep the vehicle in the driving lane.

LKS systems usually include an environmental sensor, such as for example a video system, with which the course of the lane and the relative position of the vehicle in the lane may be determined, or with which possible obstacles may be recognized. In normal driving operation, these systems are not active as long as the movement path of the vehicle corresponds approximately to the course of the lane. In this case, only the servo torque is applied to the steering system. If, however, the movement path of the vehicle deviates too far from the optimal movement path determined by the course of the driving lane, or there is some other dangerous situation, the system produces an additional actuating torque that may be haptically detected by the driver and that instructs the driver as to how he should actuate the steering system in order to keep the vehicle in the lane, or to execute an evasive maneuver. If there is a too-small actuation of the steering wheel, the driver will for example sense a decrease in the steering forces, causing him to automatically turn the steering wheel more strongly into the curve. Given a too-strong steering wheel actuation, in contrast, the system will increase the steering forces acting on the steering wheel, so that the driver will move the steering wheel further towards the straight-ahead position if desired.

For each steering intervention of the driver steering assistance system, the characteristic driving behavior of the steering system is modified, i.e., the driver suddenly feels a different counterforce at the steering wheel. The different steering feeling is unfamiliar to the driver and may be disturbing, in particular if the driver does not wish to cooperate with the proposed steering movement.

SUMMARY

An object of the present invention is therefore to create a steering assistance system whose steering interventions are significantly more comfortable for the driver, thus significantly improving driver comfort.

One aspect of an example embodiment of the present invention is that the additionally required actuating torque is adapted in such a way that it does not adversely affect the driver too strongly when steering the vehicle, and in particular is not disturbing. For this purpose, the required torque is preferably limited in its absolute value and/or in its dynamics, as described below.

According to a first example embodiment of the present invention, the gradient of the additional actuating torque is limited to a prespecified maximum value. In this way, torque jumps, which may be uncomfortable for the driver, are in particular avoided. This significantly increases steering comfort.

The maximum value is preferably a function of the magnitude of the required actuating torque, the maximum gradient in the case of large actuating torques preferably being smaller than is the case for smaller actuating torques. That is, the greater the additional actuating torque, the more slowly it should increase or decrease, in order to give the driver the possibility of compensating the additional torque should he wish to do so. The gradient limiting preferably becomes active only when the gradient is greater than a predetermined threshold value.

The maximum gradient may be chosen to have different magnitudes for positive and negative gradients of the actuating torque.

According to a second example embodiment of the present invention, the difference between a manual driving torque applied by the driver and the additional actuating torque is limited to a prespecified maximum value. This prevents excessively high forces from acting on the steering wheel which could disturb the driver if he does not wish to cooperate with the proposed steering movement. The additional actuating torque should in the end merely prompt and accelerate the driver's reaction, without disturbing the driver. The magnitude of the actuating torque should therefore increase only if the driver cooperates with the steering movement.

The above-mentioned limitation of the difference between the manual driving torque and the actuating torque preferably becomes active only when the magnitude of the actuating torque exceeds a prespecified threshold value. For very small actuating torques, the adverse effect on the driver is rather low.

According to a third example embodiment of the present invention, the actuating torque is limited to a prespecified maximum value if the actuating torque is greater than a predetermined threshold value, the driver's manual torque has a sign opposite to that of the actuating torque, the magnitude of the driver's manual torque has exceeded a prespecified threshold value, and the product of the driver's manual torque times its gradient is greater than zero. Using this method, the required actuating torque may be rapidly dismantled if the driver does not wish to cooperate with the proposed steering movement and reacts against the required actuating torque.

In the above-mentioned calculation, the gradient of the driver's manual torque may for example also be reduced using a function such as for example a dead zone function, in order to avoid jumps.

According to a fourth example embodiment of the present invention, the required actuating torque is reduced if it attempts to move the steering wheel in a particular direction and the steering wheel has already exceeded a prespecified speed in the direction of the torque. In this way, an uncomfortable or "unfeeling" steering movement may be avoided.

In addition, the sum of the magnitude of the driver's manual torque plus the magnitude of the actuating torque may be limited to a prespecified maximum value. In this way, overfatigue of the driver due to excessive steering forces and the loss of the feeling of resistance during steering may be avoided.

Preferably, the maximum magnitude of the actuating torque is also limited to a prespecified value for safety reasons.

BRIEF DESCRIPTION OF THE DRAWINGS

The present invention is explained below in more detail in relation to examples, on the basis of the accompanying figures.

DETAILED DESCRIPTION OF EXAMPLE EMBODIMENTS

Figure 1:
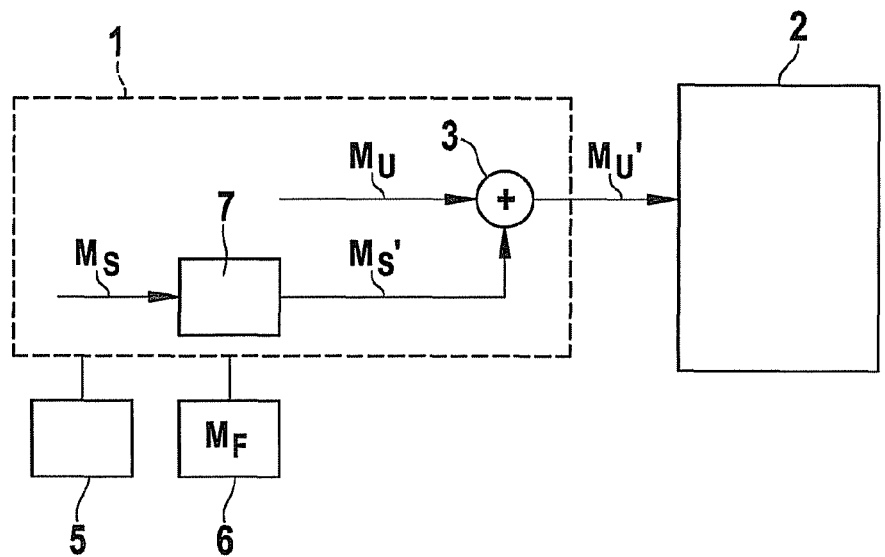
FIG. 1 shows a schematic representation of main components of a driver assistance system in a motor vehicle.

FIG. 1 shows a schematic representation of the main components of a driver steering assistance system that supports the driver when steering a vehicle. The steering assistance system includes a control device 1 that processes various sensor signals from a sensor system 5 that monitors the current driving state. Sensor system 5 may include for example wheel rotational speed sensors, a steering angle sensor, or, in the case of a LKS system, an environmental sensor system. Control device 1 is also connected to a driver manual torque sensor 6 that measures the steering forces applied by the driver.

In normal driving operation, control device 1 produces a servo torque $M_U$ that is exerted on steering system 2 of the vehicle by a steering actuator (here, the steering actuator and the steering system are combined in block 2). In certain driving situations in which the vehicle has for example departed too far from an optimal movement path, control device 1, or an external device such as for example a vehicle regulator, produces an additional actuating torque $M_S$ (required actuating torque). This may then be impressed on steering system 2 together with the servo torque $M_U$. In this way, artificial steering forces are produced that may be haptically detected by the driver and that instruct the driver as to how he should actuate the steering system in order to keep the vehicle in its lane or to execute an evasive maneuver. Generally, the additional steering forces are given a strength such that they may be overridden by the driver.

The impressing of an additional actuating torque $M_S$ may be surprising or uncomfortable for the driver. Therefore, in order to avoid a too-negative effect on the steering behavior, the additional actuating torque $M_S$ is limited or otherwise adapted as a function of its magnitude and of the current driving situation, using a separate device 7, preferably a software algorithm. The adapted actuating torque $M_S'$ is then added to the servo torque $M_U$ at a node 3. The resultant servo torque is designated $M_U'$.

Figure 2:
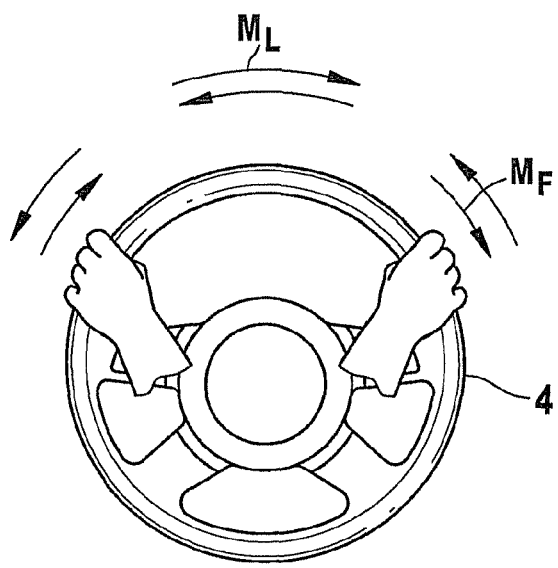
FIG. 2 shows the forces and torques acting on the steering wheel.

FIG. 2 shows the forces and torques acting on a steering wheel 4. On the one hand, there acts a steering wheel or reset torque $M_L$ that strives to move steering wheel 4 back to the straight-ahead position. This torque $M_L$ results from mechanical steering forces of steering system 2 and from modified servo torque $M_U'$. On the other hand, there acts the driver's manual torque applied by the driver, here designated $M_F$.

The required actuating torque $M_S$ may be fundamentally limited in its absolute value and/or its dynamic behavior. In the following, various methods for limiting actuating torque $M_S$ are explained in more detail on the basis of FIGS. 3 to 7. The algorithms for limiting or adapting the required actuating torque $M_S$ are preferably realized separately from the device that requires actuating torque $M_S$.

Figure 3:
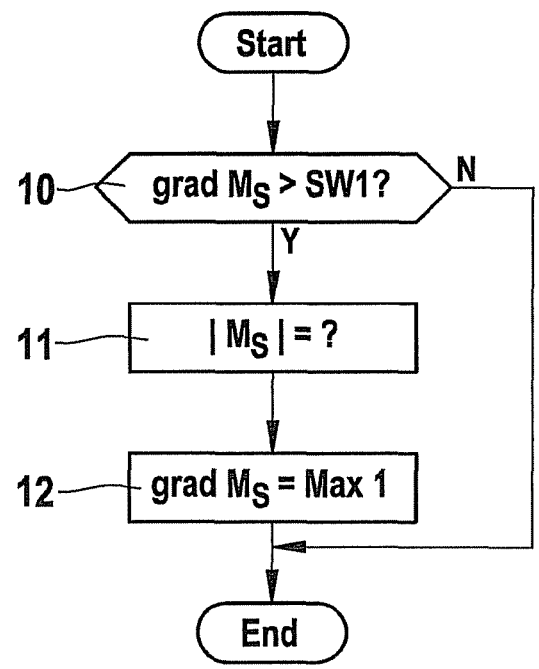
FIG. 3 shows the main method steps for improving driving comfort during a steering intervention according to a first example embodiment of the present invention.

FIG. 3 shows the main method steps of a method with which the gradient of a required actuating torque $M_S$ is limited to a prespecified maximum value. Here, in step 10 it is first checked whether the gradient of actuating torque $M_S$ would exceed a prespecified threshold SW1. If yes (J), in step 11 the magnitude of the required actuating torque $M_S$ is determined. The (rising or falling) gradient of actuating torque $M_S$ is then limited in step 12 to a maximum value Max1.

Maximum gradient Max1 is preferably a function of the magnitude of actuating torque $M_S$, the maximum gradient Max1 preferably being smaller in the case of larger actuating torques $M_S$ than in the case of smaller actuating torques $M_S$. In this way, large actuating torques $M_S$ are impressed essentially more slowly (with a gradient whose magnitude is smaller) than are smaller actuating torques $M_S$. In this way, it is avoided in particular that the driver is irritated or startled by a steering intervention. Moreover, in this way the driver is given sufficient time to react to the torque and to compensate the torque, should he desire this.

Figure 4:
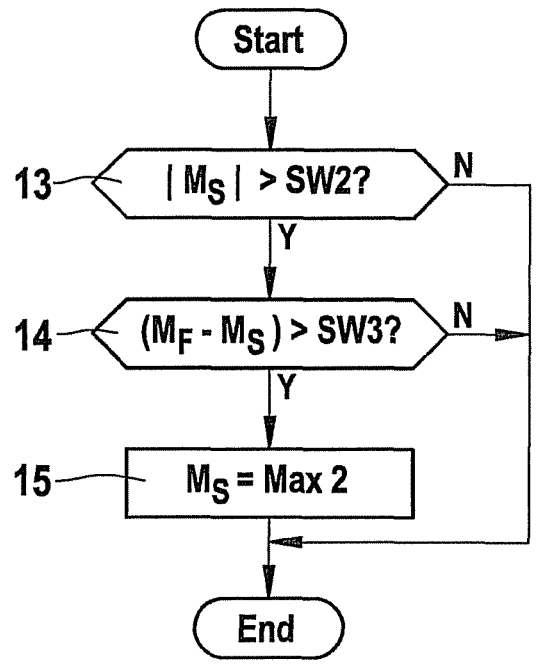
FIG. 4 shows the main method steps for improving driving comfort during a steering intervention according to a second example embodiment of the present invention.

FIG. 4 shows the main method steps of a method with which the difference between the driver's manual torque $M_F$ and the required actuating torque $M_S$ is limited to a prespecified threshold value. This function generally should become active only if the required actuating torque $M_S$ is greater than a predetermined threshold value SW2.

Therefore, in step 13 it is first checked whether the magnitude of the required actuating torque $M_S$ is greater than threshold value SW2. If yes (J), in step 14 it is queried whether the difference between the driver's manual torque $M_F$ (measured by driver manual torque sensor 6) and actuating torque $M_S$ exceeds a threshold value SW3. If yes (J), actuating torque $M_S$ is limited to a maximum value Max2. This prevents excessively high forces from acting on steering wheel 4, which the driver would have to compensate should he not wish to cooperate with the proposed steering movement. The required actuating torque $M_S$ should in the end only prompt and accelerate the reaction of the driver, without disturbing the driver.

Figure 5:
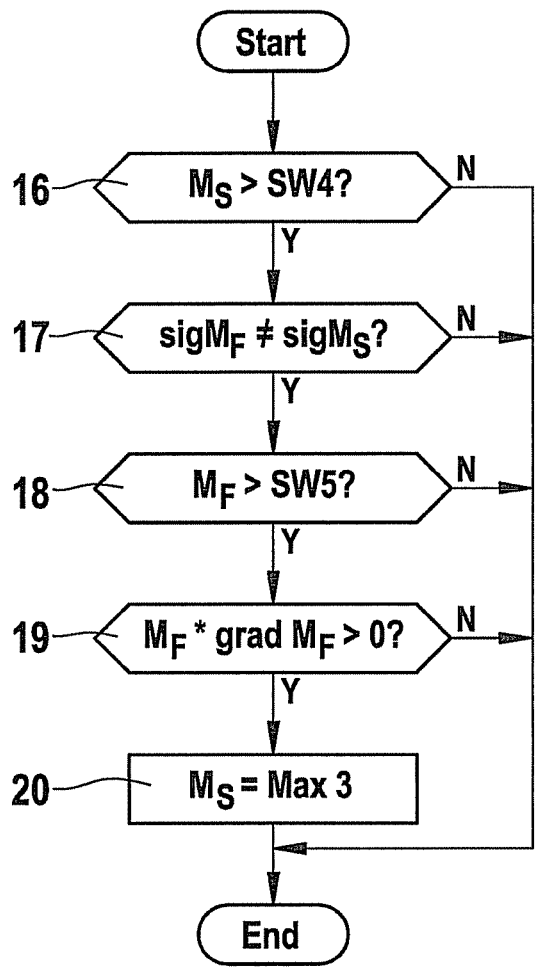
FIG. 5 shows the main method steps for improving driving comfort during a steering intervention according to a third example embodiment of the present invention.

FIG. 5 shows the main method steps of a method with which the actuating torque $M_S$ may be rapidly dismantled if the driver counter-steers. In this case, first in step 16 it is checked whether the required actuating torque $M_S$ exceeds a prespecified threshold value SW5. If yes (J), in step 17 it is queried whether the driver's manual torque $M_F$ and the actuating torque $M_S$ have opposite signs. Otherwise, the method terminates. If opposite signs are present (i.e., the driver is counter-steering), in step 18 it is queried whether the driver's manual torque exceeds a prespecified threshold value SW6. If yes (J), in step 19 the product is formed of the driver's manual torque $M_F$ and its gradient grad($M_F$), and it is determined whether this product is greater than zero. Otherwise, the method terminates. If the result in step 19 is positive (J), in step 20 the actuating torque $M_S$ is limited to a maximum value Max3.

Figure 6:
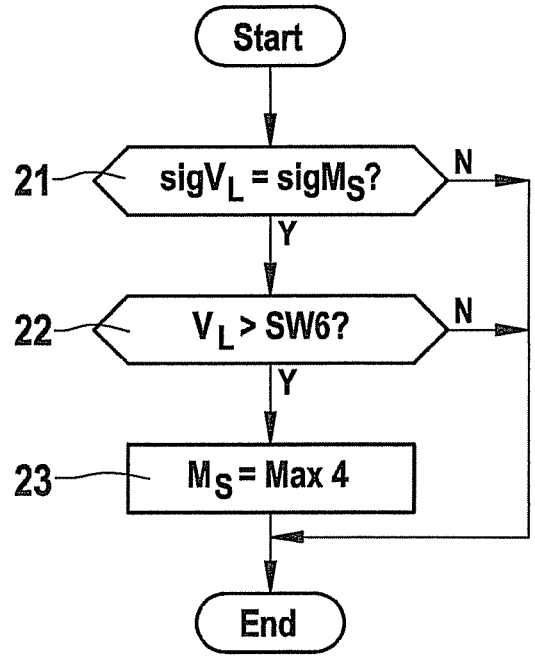
FIG. 6 shows the main method steps for improving driving comfort during a steering intervention according to a fourth example embodiment of the present invention.

FIG. 6 shows a function with which actuating torque $M_S$ may be limited to a prespecified maximum value if the steering wheel is already being moved in the direction of the required actuating torque $M_S$. For this purpose, in step 21 it is checked whether steering angle speed $v_L$ and actuating torque $M_S$ are oriented in the same direction. If yes (J), in step 22 it is queried whether steering angle speed $v_L$ exceeds a prespecified threshold value SW8. If yes (J), the actuating torque is set to a particular value max4 (step 23).

Figure 7:
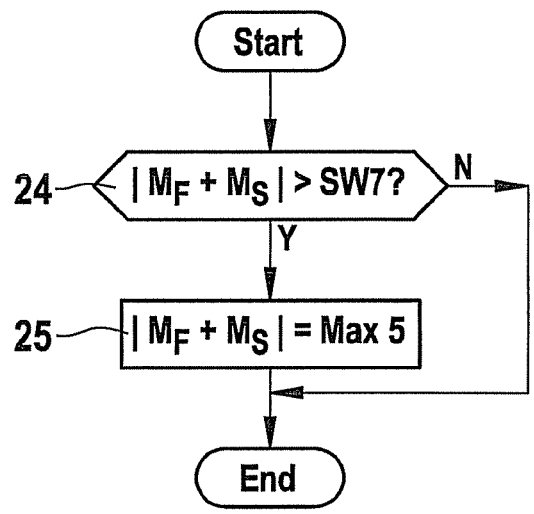
FIG. 7 shows the main method steps for improving driving comfort during a steering intervention according to a fifth example embodiment of the present invention.

FIG. 7 shows a method with which actuating torque $M_S$ may be limited to a prespecified value if the sum of the driver's manual torque and the actuating torque exceeds a prespecified threshold. For this purpose, in step 24 it is first checked whether the magnitude of the sum of the driver's manual torque $M_F$ and actuating torque $M_S$ exceeds a prespecified threshold value SW9. If yes (J), in step 25 the sum is set to a prespecified maximum value Max5. This correspondingly reduces actuating torque $M_S$.

What is claimed is:

1. A method for supporting a driver when steering a vehicle, comprising:
    exerting a servo torque which reduces the amount of steering forces required by the driver and an additional actuating torque which causes the driver to make a change in a position of a steering wheel on a steering system of the vehicle; and
    limiting a gradient of the additional actuating torque to a prespecified maximum value,
    wherein the maximum value has a different magnitude for positive and negative gradients, and
    wherein the maximum value has an inversely proportional relationship with a magnitude of the additional actuating torque.

2. The method as recited in claim 1, wherein the maximum value is a function of a magnitude of the additional actuating torque.

3. A method for supporting a driver when steering a vehicle, comprising:
    exerting a servo torque which reduces the amount of steering forces required by the driver and an additional actuating torque which causes the driver to make a change in a position of a steering wheel on a steering system of the vehicle, the additional actuating torque being produced as a function of a driving situation; and
    limiting a difference between a manual torque applied by the driver and the additional actuating torque to a prespecified maximum value,
    wherein the difference is limited only if a magnitude of the additional actuating torque exceeds a prespecified threshold value.

4. A device for supporting a driver when steering a vehicle, comprising:
    a control device that exerts a servo torque which reduces the amount of steering forces required by the driver and an additional actuating torque which causes the driver to make a change in a position of a steering wheel on a steering system of the vehicle, the additional actuating torque being produced as a function of a driving situation, the control device being adapted to limit a gradient of the additional actuating torque to a predefined maximum value, wherein the maximum value has a different magnitude for positive and negative gradients, and wherein the maximum value has an inversely proportional relationship with a magnitude of the additional actuating torque.

5. The device as recited in claim 4, further comprising:
    a driver manual torque sensor to measure a driver manual torque.

6. The device as recited in claim 4, wherein a sum of a driver manual torque plus the additional actuating torque is limited if a magnitude of the sum exceeds a prespecified threshold value.

7. The device as recited in claim 4, wherein a maximum magnitude of the additional actuating torque exerted on the steering system is limited to a prespecified value.

8. The device as recited in claim 4, further comprising:
    a driver manual torque sensor to measure a driver manual torque;
    wherein a sum of a driver manual torque plus the additional actuating torque is limited if a magnitude of the sum exceeds a prespecified threshold value, and
    wherein a maximum magnitude of the additional actuating torque exerted on the steering system is limited to a prespecified value.

* * * * *

UNITED STATES PATENT AND TRADEMARK OFFICE
CERTIFICATE OF CORRECTION

PATENT NO.         : 8,688,326 B2                                            Page 1 of 1
APPLICATION NO. : 12/300420
DATED              : April 1, 2014
INVENTOR(S)        : David Rubia It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this

Twenty-ninth Day of September, 2015

Michelle K. Lee
*Director of the United States Patent and Trademark Office*